(12) United States Patent
Levi et al.

(10) Patent No.: US 12,171,197 B2
(45) Date of Patent: Dec. 24, 2024

(54) RECONFIGURABLE PROTECTIVE BEEHIVE COVER AND METHOD OF USE

(71) Applicant: Andrew Levi, Dallas, TX (US)

(72) Inventors: Andrew Levi, Dallas, TX (US); Jadi Oliver, Dallas, TX (US)

(73) Assignee: Andrew Levi, Dallas, TX (US)

( * ) Notice: Subject to any disclaimer, the term of this patent is extended or adjusted under 35 U.S.C. 154(b) by 133 days.

(21) Appl. No.: 18/192,454

(22) Filed: Mar. 29, 2023

(65) Prior Publication Data

US 2023/0309518 A1    Oct. 5, 2023

Related U.S. Application Data

(60) Provisional application No. 63/362,054, filed on Mar. 29, 2022.

(51) Int. Cl.
*A01K 47/06*    (2006.01)

(52) U.S. Cl.
CPC .................... *A01K 47/06* (2013.01)

(58) Field of Classification Search
CPC ....................................... A01K 47/06
USPC ........................................... 150/154
See application file for complete search history.

(56) References Cited

U.S. PATENT DOCUMENTS

| | | | | |
|---|---|---|---|---|
| 83,388 A * | 10/1868 | Johnson | ............... | A01K 47/00 449/30 |
| 302,834 A * | 7/1884 | Franklin | ............... | A01K 47/00 449/41 |
| 1,067,459 A * | 7/1913 | Bosserman | ........... | A01K 47/00 449/31 |
| 1,871,595 A * | 8/1932 | Eldred | ................... | A01K 47/06 449/30 |
| 2,530,801 A * | 11/1950 | Babcock, Jr. | ......... | A01K 47/06 449/29 |
| 2,599,141 A * | 6/1952 | Taylor | ................... | A01K 47/06 449/12 |
| 2,709,820 A * | 6/1955 | Wahl | ...................... | A01K 47/00 449/20 |
| 3,438,070 A * | 4/1969 | Florance | ............... | A01K 47/06 449/2 |
| 4,300,250 A * | 11/1981 | Taylor | ................... | A01K 47/06 449/12 |
| 4,494,528 A * | 1/1985 | Horton | ................... | F24S 23/77 449/12 |
| 4,983,139 A * | 1/1991 | Kretschmann | ......... | A01K 47/06 449/30 |
| 6,579,147 B1 * | 6/2003 | DeYoung | ............... | A01K 47/06 449/3 |

(Continued)

*Primary Examiner* — Don M Anderson
*Assistant Examiner* — Justin Caudill
(74) *Attorney, Agent, or Firm* — Schultz & Associates, P.C.

(57) ABSTRACT

A preferred embodiment provides a reconfigurable and removable cover securely fixed to an exterior of a hive structure. The preferred material of the cover provides both temperature and humidity control through use of various layers which allow proper air flow. Temperature control is provided by a novel combination of heat absorptive and heat reflective layers and surfaces. A reduction of heat loss in the hive structure reduces the amount of energy required to keep the hive at the desired temperature thereby preserving food resources and preventing colony collapse. The heat reflective layers cool the hive in the summer by reflecting solar radiation.

22 Claims, 16 Drawing Sheets

(56) References Cited

U.S. PATENT DOCUMENTS

| | | | |
|---|---|---|---|
| 11,324,204 B2* | 5/2022 | McCoy | A01K 47/06 |
| 2018/0116182 A1* | 5/2018 | Frey | A01K 47/06 |

* cited by examiner

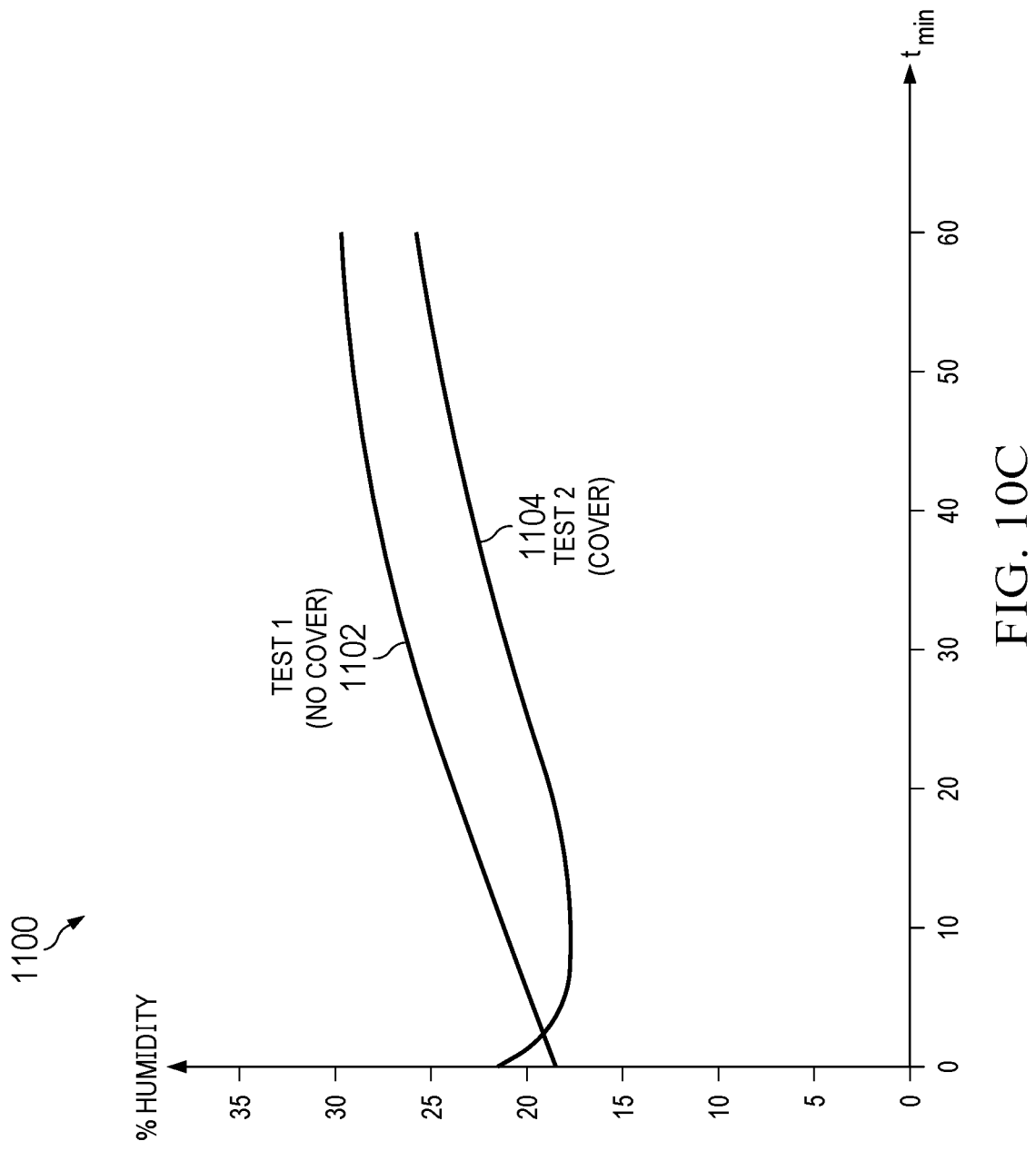

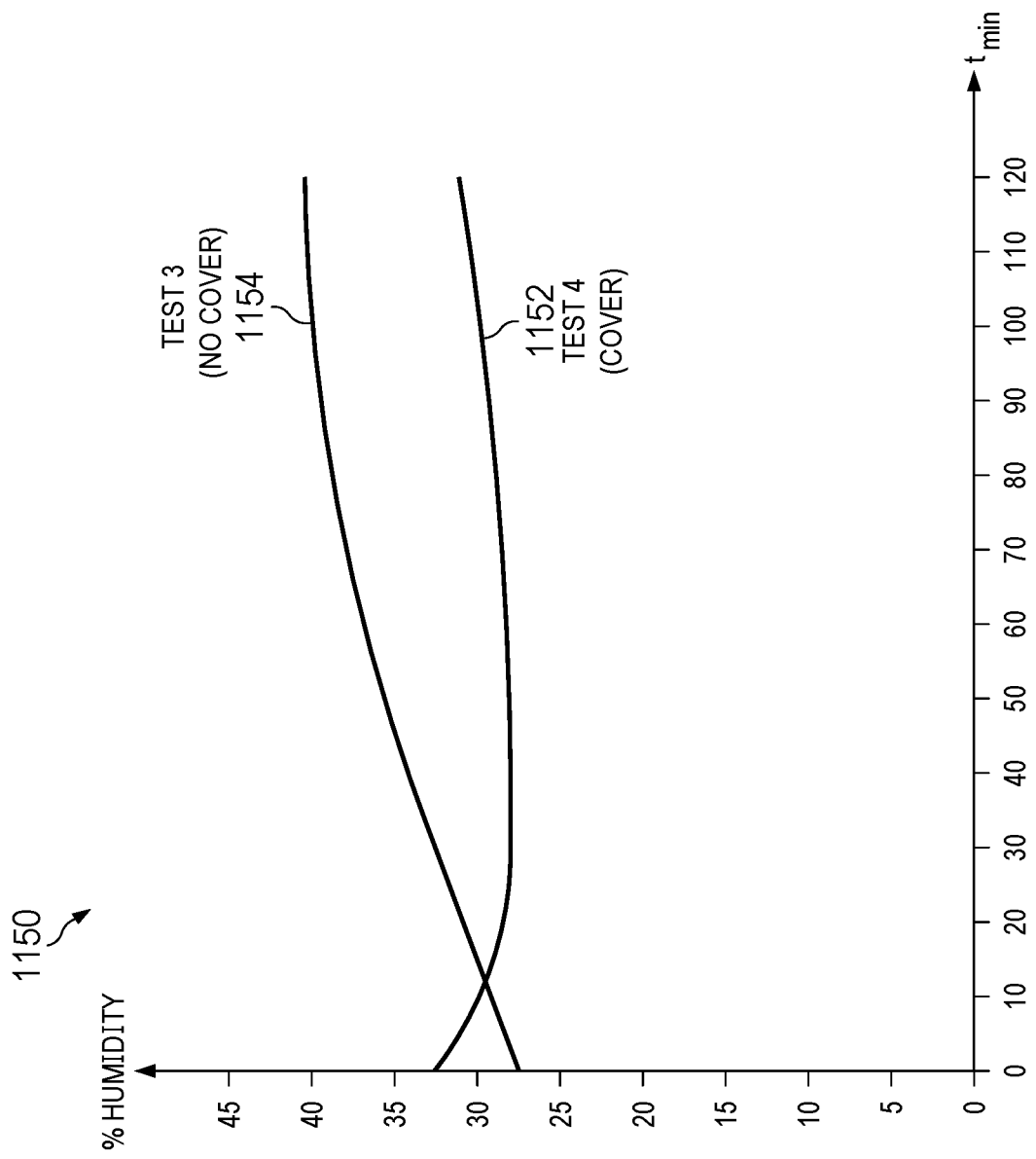

RECONFIGURABLE PROTECTIVE BEEHIVE COVER AND METHOD OF USE

CROSS-REFERENCE TO RELATED APPLICATIONS

This application claims priority benefit from U.S. Provisional Application No. 63/362,054, filed on Mar. 29, 2022. The patent application identified above is incorporated here by reference in its entirety to provide continuity of disclosure.

FIELD OF THE INVENTION

The present invention relates to beehives and apiary maintenance.

BACKGROUND OF THE INVENTION

Mankind has gathered honey from honeybees for thousands of years. The first image of wild honeybee harvesting comes from cave paintings in Spain dating from 8,000-6,000 BC. The first tended hives are believed to have occurred around 2,500 BC in Egypt and possibly earlier in China. From the time of the ancient Egyptians to the 18$^{th}$ century, beekeepers captured swarming bees and kept them in skeps, structures most often made of woven, stacked rings of rushing or straw that form a pointed dome. While simple to construct, they offer beekeepers no options to help the colony grow and store its honey. When skeps reach capacity, the colony divides in two, and the old queen leaves with half the bees to form a new colony the process we know as swarming. To extract honey from the original colony, beekeepers break open the skep and remove the honeycombs, effectively destroying the old colony.

Referring to FIGS. 1 and 2, most modern beehives, such as beehive 101, consist of distinct parts that provide structure for the colony to store food and tend brood, as well as provide protection from the elements and predators.

The bottom board 102 forms the foundation of the hive and includes entrance 105 for bees to enter and exit the hive. Many times, an entrance reducer, such as entrance reducer 103 is provided to narrow the entrance to the hive to prevent predators such as robber bees from entering.

Hive body 104 is an expandable stack of components, such as "supers", "brood boxes" and other components that are positioned on bottom board 102 and are each individually removable for cleaning and maintenance.

Brood box 106 is normally the lowest box in the stack. It is designed for bees to raise their young and store honey.

Queen excluder grate 107 is positioned between the upper most brood box and the supers to prevent the queen from entering the supers and laying eggs. Queen excluder grate 107 also allows honeycombs built in shallow frame 112 to be collected without damaging the brood in brood box 106.

Supers, such as shallow super 108 are positioned on brood box 106 and form containers for harvestable honey. Supers can be shallow or deep and are stackable and can be added one on top of the other to increase honey production.

Frames such as deep frame 110 and shallow frame 112 are each comprised of a generally rectangular wooden box, supporting a screen insert called a foundation. Frames are hung vertically within the boxes and can be shifted in position as needed for hive management.

Foundations, like foundations 110a and 112a, include embedded screen wire usually coated with beeswax or plastic and are designed to support honeycombs. Typically, the foundations are vertical and planar so that they may be easily removed for honey collection.

Inner cover 114 is positioned on the uppermost super to provide protection from weather and allow ventilation and internal feeding the hive body.

Outer cover 116 is positioned on inner cover 114 and acts as a roof for the hive. Typically, the outer cover extends horizontally past the outside of the hive body to prevent water from entering the hive in inclement weather. The outer cover may include a flat, gabled or inclined roof, and may include a metal surface, to further protect the hive body.

Beehives are microclimates with conditions that require careful control to produce honey at optimum levels. Changes in beehive climate affect honeybees.

The optimum temperature inside a beehive is 95° F. in the brood area. It may be different in other areas of the beehive. Researchers have found an average temperature of 71° F. around the beehive that is immediately above the brood area during winter. Empty areas of the beehive that are not in current use, have been found to have temperatures as low as 52° F. during winter. This temperature gradient is a natural result of the honeybees prioritizing the brood and the queen over other areas of the beehive.

Temperature above or below the optimum causes altered behavior in bees. For example, the queen often stops egg production when hive temperatures vary greatly from 95° F. Extreme temperatures above 110° F. are fatal to bee populations. Likewise, temperatures below 28° F. can be fatal.

The optimum humidity inside a beehive is 60%. Ideally, nectar has water content of 17%, which is difficult to maintain at humidities other than 60%. At the optimum humidity, evaporation from nectar is minimized, thus maximizing honey production.

Low humidity, below 50%, causes honeybees to desiccate eggs. The eggs cannot hatch and may be damaged, thus resulting in a drop in population.

High humidity, above 70%, raises the likelihood of fungus and mold growth. High humidity also causes condensation in the hive. Cold water droplets falling onto bees cause them to die quickly due to rapid cooling from evaporation.

Honeybees instinctively regulate hive temperature. For example, when the temperature drops below 57° F., the bees form a "cluster." In a cluster, bees group together inside the beehive to preserve heat by being tightly packed together. The bees also generate heat by flexing the muscles of their thoraxes used for flight or unhinging their wings so that their bodies can vibrate. This behavior raises the temperature at the center of the cluster to a favorable temperature for the queen to lay eggs, and for the brood to develop normally.

At temperatures above 95° F., honeybees initiate cooling of the beehive by fanning their wings at the hive entrance and inside the hive body to create air currents. Other behavior is triggered such as use of water to cool the hive, and "bearding" to lower the number of bees in the beehive.

Bees also instinctively regulate humidity in the hive. For example, when the humidity is too low, the bees release water into the beehive to raise the humidity level. They may also fan humid air from outside the beehive into the beehive cavity to increase the humidity of the beehive cavity. If the humidity of the beehive cavity is too high, honeybees fan dry air into the beehive to dry the interior.

In the past, apiary managers and beekeepers have used various techniques to assist the hive in maintaining proper humidity and temperature.

For example, construction of the hive body from various types of porous wood has been used as an apiary management technique in the past. Certain types of wood, such as pine, allow evaporative cooling and promote air circulation. However, construction materials that are advantageous in the summer, by promoting airflow for example, are often disadvantageous or deadly in the winter. So, selective use of materials is not entirely effective.

Beehive location has also been used as a method to control temperature. For example, locating beehives under large trees allows them to retain heat during winter months. Likewise, moving beehives away from direct summer sun in the summer prevents overheating. Further, providing shielding from wind is known to prevent unintended cooling through forced air convection. But these methods often risk disturbing the colony by relocating it, thereby reducing their effectiveness.

Few if any current apiary management techniques are sufficient to avoid problems which arise from erratic weather patterns. With current changing and often erratic weather patterns, such as violent spring storms, unusually hot, dry summers and uncommonly cold winter months, significant habitat loss, greatly reduced nectar flows, and high colony mortality rates are more common. Erratic weather patterns also increase the prevalence of pests which reduce brood size year over year. Spring starvation is particularly problematic if the colony is not strong due to pests or disease as they enter winter.

Despite the preservation efforts of apiaries and beekeepers, bee population is in decline because of recent erratic weather patterns in the United States. Year over year, it is estimated that 45% of managed honeybees colonies were lost from 2020 to 2021, and another 39% of managed honeybee colonies were lost from 2021 to 2022. From 1997 to 2008, it is estimated that the number of hives fell from 6 million to 2.4 million, a reduction of about 60%.

Therefore, there is an urgent need to improve managed hive structures to stimulate and protect the bee population.

SUMMARY OF THE INVENTION

A preferred embodiment provides a reconfigurable and removable cover securely fixed to an exterior of a hive structure. The preferred material of the cover provides both temperature and humidity control through use of various layers which allow proper air flow. Temperature control is provided by a novel combination of heat absorptive and heat reflective layers and surfaces. A reduction of heat loss in the hive structure reduces the amount of energy required to keep the hive at the desired temperature thereby preserving food resources and preventing colony collapse. The heat reflective layers cool the hive in the summer by reflecting solar radiation.

In one preferred embodiment, the cover is comprised of multiple panels depending on the number of boxes forming the hive body. Preferably, each panel is connected to another panel with a weatherproof zipper. In another preferred embodiment, the cover is comprised of a single panel designed to fit the full length of the hive. One or more durable straps are attached to the outer surface of the cover and positioned by various closures to allow an efficient fit. Each strap is adjustable and includes a quick release buckle allowing for the cover to be securely fastened against the hive structure.

Each panel may be formed of one or more layers. In a preferred embodiment, the inner layer comprises a thermal reflective layer which is present to reduce heat loss. An insulating central layer is provided. A weather resistant outer layer is provided in order to further reduce heat loss and protect the hive exterior from the elements and pests.

BRIEF DESCRIPTION OF THE DRAWINGS

In the detailed description of the preferred embodiments presented below, reference is made to the accompanying drawings.

FIG. 10C is a graph of humidity test data.

FIG. 10D is a graph of humidity test data.

DETAILED DESCRIPTION OF THE INVENTION

In the description that follows like parts are marked throughout the specification and figures with the same numerals, respectively. The figures are not necessarily drawn to scale and may be shown in exaggerated or generalized form in the interest of clarity and conciseness. Unless otherwise specified, use of the term "about" indicates a tolerance of ±20%.

Figure 1:
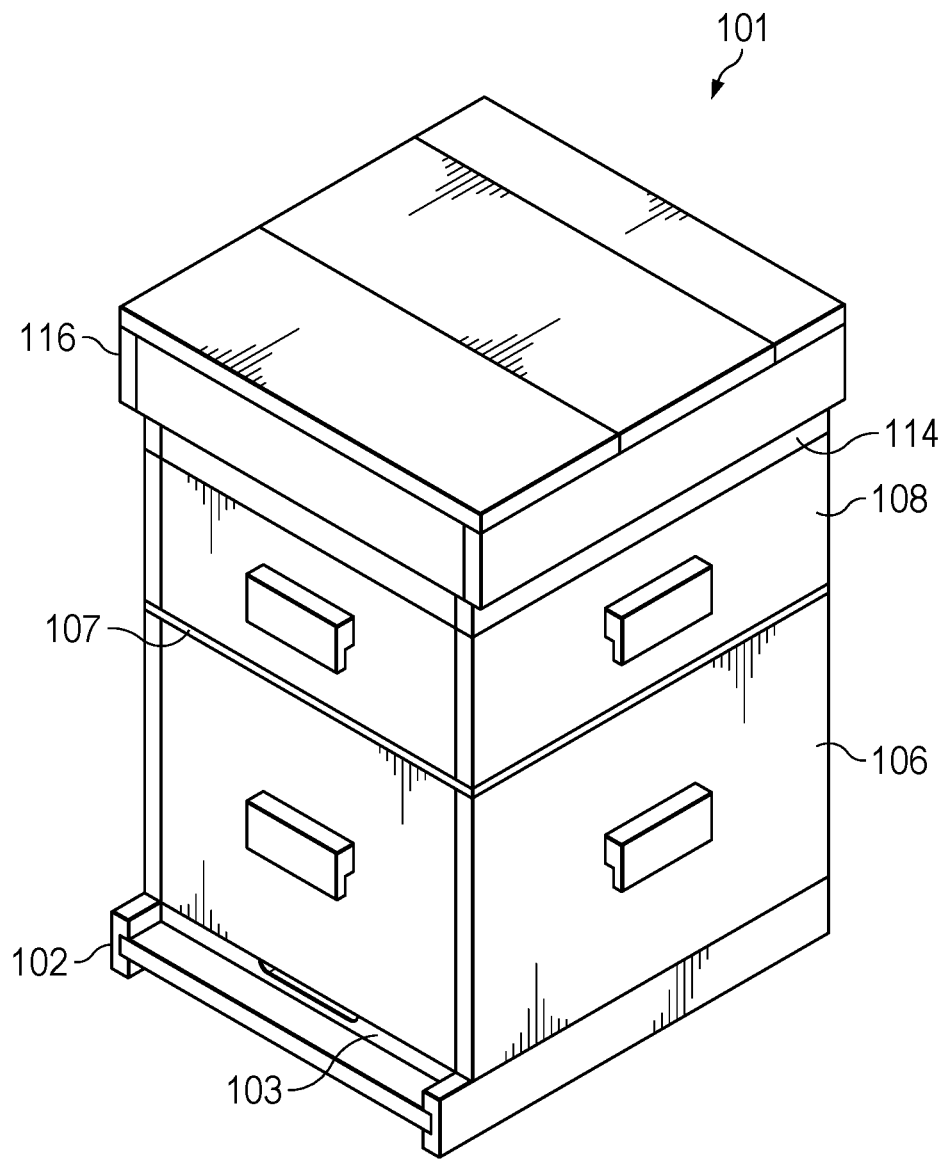
FIG. 1 is an isometric view of a prior art beehive.
Figure 2:
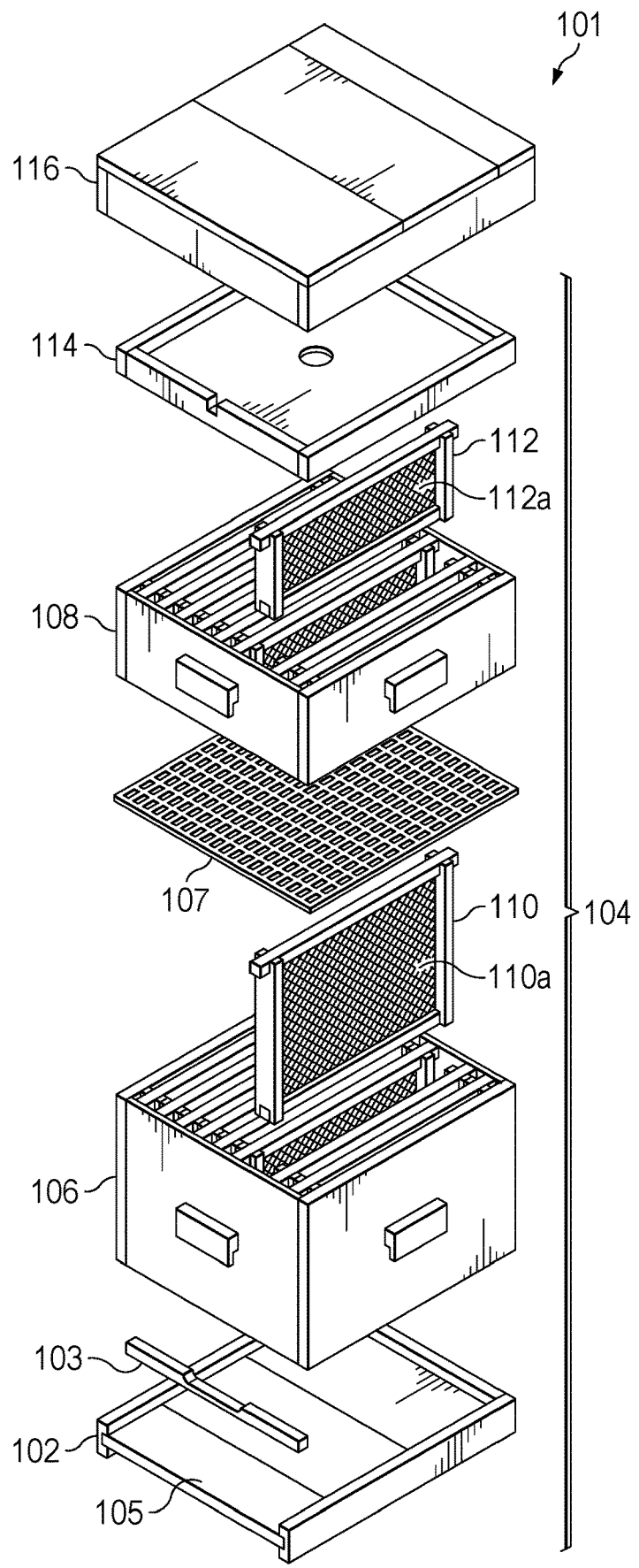
FIG. 2 is an exploded isometric view of a prior art beehive.
Figure 3:
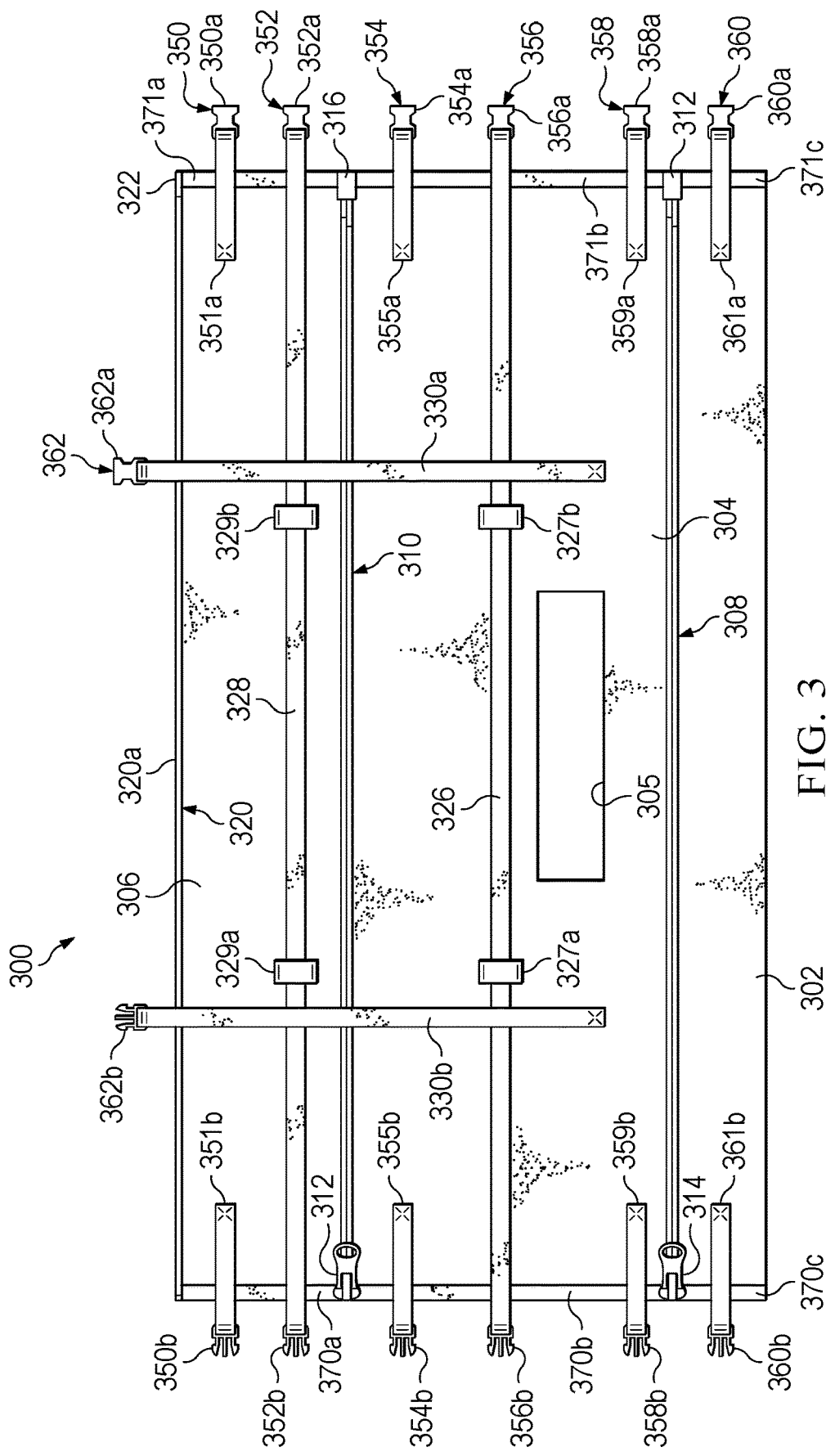
FIG. 3 is a front view of a preferred embodiment of the hive cover.

Referring to FIG. 3, preferred hive cover 300 will be further described.

Preferred hive cover 300 is comprised of three panels, skirt panel 302, lower panel 304, and at least one upper panel 306. The upper panel is optional. Likewise additional upper panels may be added to accommodate taller hives.

Skirt panel 302 is connected to lower panel 304 by zipper 308. Similarly, lower panel 304 is connected to upper panel 306 by zipper 310. Additional upper panels may be attached to upper panel 306 through connection to zipper 320.

Skirt panel 302 further comprises closure straps 360a and 360b. Closure straps 360a and 360b are fixed horizontally on the skirt panel and are diametrically opposed. Closure straps 360a and 360b are connected to side release buckle 360. Hook end 362a of side release buckle 360 is connected to closure strap 360a. Insertion end 362b of side release buckle 360 is connected to closure strap 360b.

Skirt panel 302 further comprises hook tape 370c and loop tape 371c, both positioned vertically, on the outside edges of the panel. Preferably, hook tape 370c and loop tape 371c are diametrically opposed and designed to provide an adjustable and releasable closure, as will be further described.

Lower panel 304 further comprises closure straps 359a and 359b. Closure straps 359a and 359b are fixed horizontally on the lower panel and are diametrically opposed. Closure straps 359a and 359b are connected to side release buckle 358. Hook end 358a of side release buckle 358 is connected to closure strap 359a. Insertion end 358b of side release buckle 358 is connected to closure strap 359b.

Lower panel 304 further comprises closure straps 355a and 355b. Closure straps 355a and 355b are fixed horizontally on the lower panel and are diametrically opposed. Closure straps 355a and 355b are connected to side release buckle 354. Hook end 354a of side release buckle 354 is connected to closure strap 355a. Insertion end 354b of side release buckle 354 is connected to closure strap 355b.

Lower panel 304 further comprises circumferential strap 326. Circumferential strap 326 is movably retained on the surface of lower panel 304 by retaining loops 327a and 327b. The retaining loops are non-releasably fixed to the outer surface of the panel by durable stitching, an industrial adhesive or inductive welding. Preferably, circumferential strap 326 may slide horizontally within the retaining loops. Circumferential strap 326 is connected to side release buckle 356. Side release buckle 356 includes hook end 356a and insertion end 356b.

Lower panel 304 further comprises hook tape 370c and loop tape 371c, both positioned vertically on the outside edges of the panel. Preferably, hook tape 370c and loop tape 371c are diametrically opposed and designed to provide an adjustable and releasable closure, as will be further described.

Lower panel 304 further comprises vertical straps 330a and 330b. Each vertical strap is permanently fixed to the exterior surface of the lower panel in a vertical orientation. Vertical straps 330a and 330b are connected to side release buckle 362. Side release buckle 362 includes hook end 362a connected to vertical strap 330a. Insertion end 362b is connected to vertical strap 330b.

Lower panel 304 further comprises opening 305. Preferably, opening 305 is generally a horizontal rectangular hole in the panel, positioned to be adjacent entrance 105, and between the vertical straps, as previously described.

Upper panel 306 further comprises circumferential strap 328. Circumferential strap 326 is movably retained on the surface of upper panel 306 by retaining loops 329a and 329b. The retaining loops are non-releasably fixed to the outer surface of the panel by durable stitching, an industrial adhesive or inductive welding. Preferably, circumferential strap 328 may slide horizontally within the retaining loops. Circumferential strap 328 is connected to side release buckle 352. Side release buckle 352 includes hook end 352a and insertion end 352b.

Upper panel 306 further comprises closure straps 351a and 351b. Closure straps 351a and 351b are fixed horizontally on the upper panel and are diametrically opposed. Closure straps 351a and 351b are connected to side release buckle 350. Hook end 350a of side release buckle 350 is connected to closure strap 351a. Insertion end 350b of side release buckle 350 is connected to closure strap 351b.

Upper panel 306 further comprises hook tape 370c and loop tape 371c, both positioned vertically on the outside edges of the panel. Preferably, hook tape 370c and loop tape 371c are diametrically opposed and designed to provide an adjustable and releasable closure, as will be further described.

In each embodiment, the straps are optional, but preferred. Likewise, in each embodiment, the hook and loop closures are optional, but preferred. In a preferred embodiment, each of the vertical straps and the closure straps is secured to the outer surface of the panels in a single location by a durable cross-type stitching pattern or a non-releasable industrial adhesive, or inductive heat welding. In a preferred embodiment, all straps are manufactured from black nylon webbing approximately one inch in width, such as part number 100NYLWBK-FT available from Sailrite Enterprises, Inc. of Columbia City, Indiana. In a preferred embodiment, each segment of hook and loop tape on the panels is a 2-inch Velcro® type tape, available from Textol Systems, Inc. of Carlstadt, New Jersey. In each case, the hook and loop tape is fixed to the exterior of the panel by multiple rows of durable stitching, a suitable permanent adhesive, or inductive welding.

Figure 4:
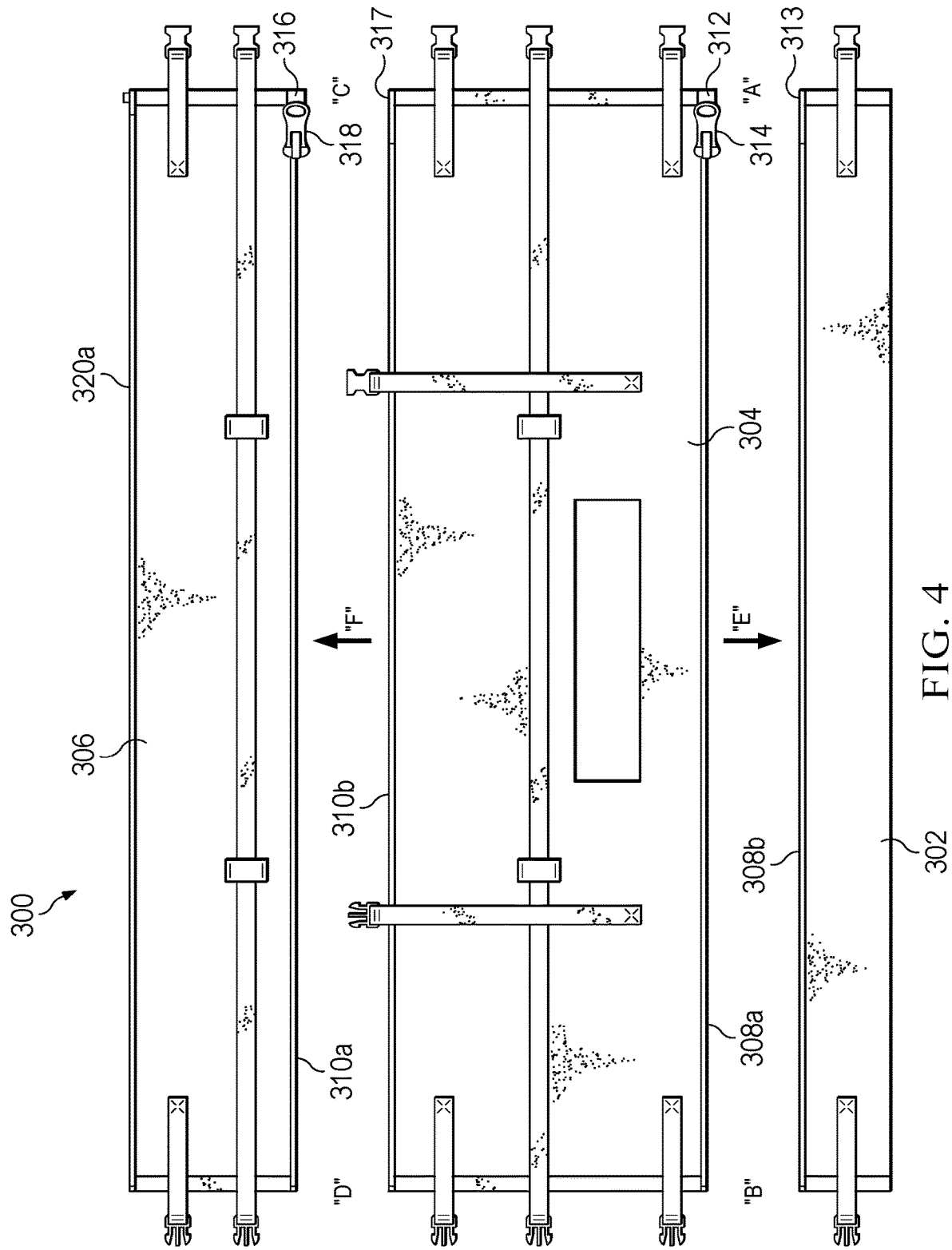
FIG. 4 is an exploded view of a preferred embodiment of the hive cover.

Referring then to FIG. 4, the reconfigurable nature of the panels of a preferred embodiment will be further described.

Zipper 308 further comprises interlocking teeth section 308a and teeth section 308b. Teeth section 308a, includes starter box 312. Teeth section 308b includes insertion pin 313. Insertion pin 313 is adapted to engage starter box 312. Car 314 is positioned to engage teeth sections 308a and 308b. As car 314 is moved from position "A" to "B", teeth section 308a engages teeth section 308b, thereby attaching lower panel 304 to upper panel 306. Likewise, teeth sections 308a and 308b may be disengaged by moving car 314 from position "B" to position "A" thereby disengaging lower panel 304 from upper panel 306, in direction "E".

Zipper 310 further comprises interlocking teeth section 310a and teeth section 310b. Teeth section 310a, includes starter box 316. Teeth section 310b includes insertion pin 317. Insertion pin 317 is adapted to engage starter box 316. Car 318 is positioned to engage teeth sections 310a and 310b. As car 318 is moved from position "C" to "D" to engage teeth sections 308a and 308b, thereby attaching skirt panel 302 to lower panel 304. Likewise, teeth sections 310a and 310b may be disengaged by moving car 318 from position "D" to position "C" thereby disengaging upper panel 306 from lower panel 304, in direction "F".

Zipper 320 further comprises interlocking teeth section 320a. Teeth section 320a includes insertion pin 322. Insertion pin 322 is adapted to engage a starter box on an additional upper panel (not shown). Likewise, teeth section 320a is adapted to engage a complimentary teeth section on additional upper panels (also not shown).

In a preferred embodiment, zipper 308, zipper 310 and zipper 320 are each a "#20" zipper, having teeth which measure approximately 20 millimeters across, available from The YKK Group of Tokyo, Japan. Preferably, the teeth of the zippers are manufactured of a Delrin plastic and are molded onto zipper tape which makes them both durable and weatherproof. In other preferred embodiments, the zippers may be replaced by other commensurate closure types, such as hook and loop material, magnetic seam closures or stainless-steel snaps.

Figure 5:
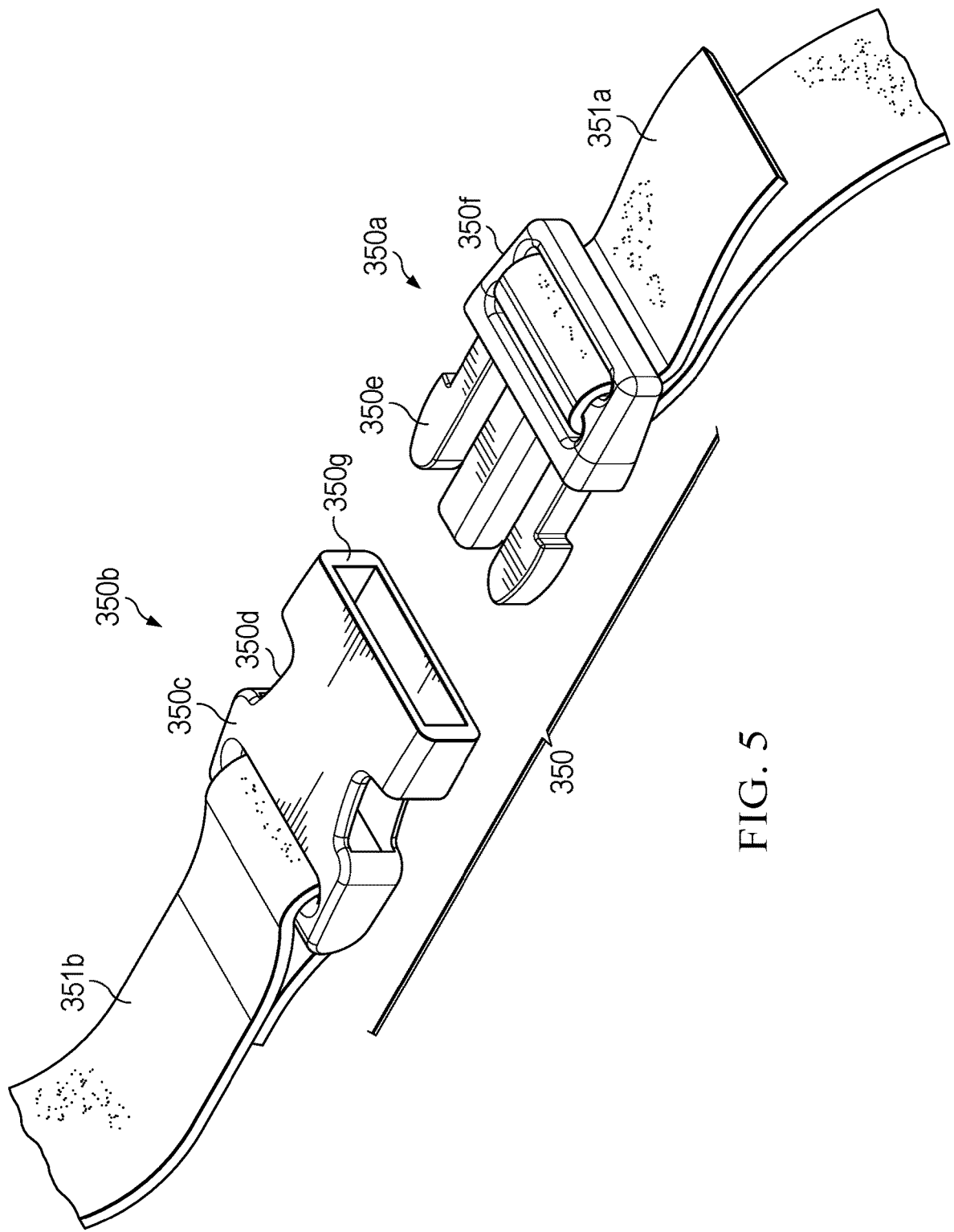
FIG. 5 is a detail view of a preferred side release buckle.

Referring then to FIG. 5, preferred side release buckle 350, will be further described. Side release buckle 350 is described as an example of side release buckles 350, 352, 354, 356, 358, 360 and 362 as the components and functions of each are identical.

Side release buckle 350 further comprises hook end 350a and insertion end 350b. Hook end 350a includes prongs 350e diametrically opposed to chape 350f. Chape 350f is releasably coupled to closure strap 351a, and allows for adjustable tightening of the closure strap as is known in the art. Insertion end 350b further comprises open front side

350g and side hole 350d. Insertion end 350b further comprises chape 350c. Preferably, chape 350c is non-removably fixed to closure strap 351b.

In use, prongs 350e are inserted into open front side 350g until prongs 350e engage and lock into side holes 350d. The prongs may be disengaged by applying an inward force on both prongs simultaneously, thereby disengaging hook in 350a from insertion in 350b.

Preferably, side release buckle 350 is part number 104322-US, available from Sailrite. Ideally, side release buckle 350 is manufactured from polyacetal (POM) or a nylon, a durable and flexible nylon plastic.

Figure 6A:
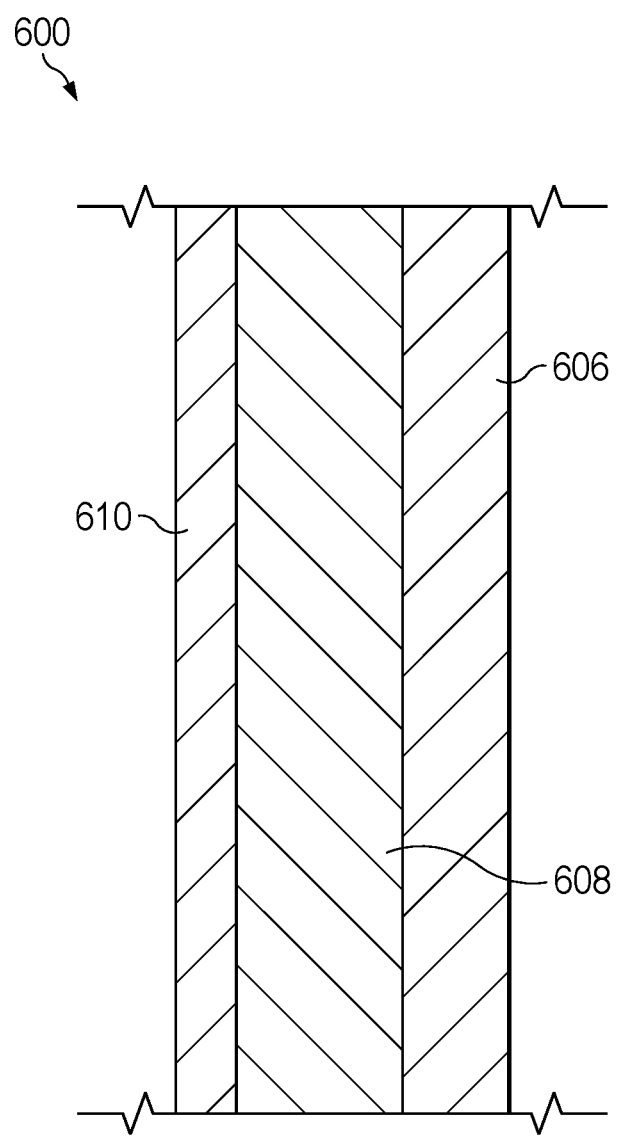
FIG. 6A is a cutaway view of a preferred panel.

Referring then to FIG. 6A, a preferred panel construction will be further described. In one preferred embodiment, the panel construction is consistent for each of the skirt, lower and upper panels. In other embodiments, the construction of the panels may differ, one to the other, depending on the needs of the hive.

Panel construction 600 is comprised of three layers, outer layer 606, interior lining 608, and inner layer 610.

Preferably, outer layer 606 is a durable marine vinyl such as VViViD Weatherproof, available from VViViD Vinyl of Montreal, Canada. Alternatively, outer layer 606 is manufactured from a nylon or polyester material such as Goretex® or eVent, or a weave of waxed cotton. A sealant of polyurethane may be applied to the exterior of the material for increased water impermeability. The exterior of the material may be a dark color. For the purposes of this disclosure, a "dark color" means a color capable of absorbing radiant heat such as black, dark brown or navy, or a military camouflage pattern, having a flat, non-reflective surface. The exterior of the material may also be a light color. For the purposes of this disclosure a "light color" means a color capable of reflecting radiant heat such as bright white, a light tan or light gray or a camouflage pattern of tan, white or gray. A glossy surface is preferred for the light color.

Interior lining 608 is preferably a water proof batting material is bonded in place to outer layer 606 and inner layer 610 by various seams in quilted stitching or a suitable industrial adhesive. Preferably, the interior lining is a polyester Insul-Bright® material available from The Warm Company of Lynnwood, Washington. In another embodiment, interior lining 608 is a disposable plastic insulation such as bubble wrap, spun glass fibers polystyrene or polyethylene. Hex-cell corrugate cardboard may also be employed as a degradable alternative.

Inner layer 610, preferably a heat reflective material, manufactured from Temptrol® or equivalent, and is capable of forming a radiant barrier. A "reflective material", for the purposes of this disclosure, means a material capable of reflecting heat such as a bright white, a silver matte finish or a silvered or mirrored material having a polished glossy surface. Inner layer 610 functionally reflects heat generated by the hive and reduces heat loss from the hive body. Temptrol® material is available from U.S. Energy Products of Miami, Florida. In another embodiment, inner layer 610 can be a reflective metallic Mylar® material with additional flexibility provided by quilting or cross-stitching.

Figure 6B:
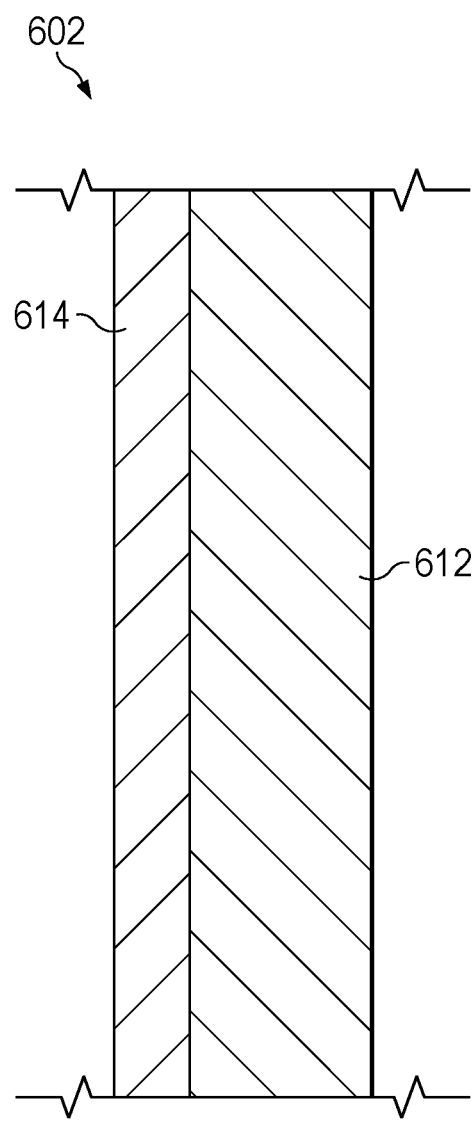
FIG. 6B is a cutaway view of a preferred panel.

Referring to FIG. 6B, an alternate embodiment of a preferred panel construction will be further described.

Panel construction 602 is comprised of outer layer 612 and inner layer 614. Outer layer 612 is preferably constructed of materials as previously described. Preferably outer layer 612 is a dark color for winter use, or a light color for summer use. The dark color serves to absorb solar radiation in the winter and thereby further reduce heat loss from the hive body. In other embodiments, inner layer 614 may be a reflective or have a metallic finish in order to reflect heat from sunlight away from the hive and thereby cool the hive during the summer. Outer layer 612 is bonded to inner layer 614 by a suitable industrial adhesive. Inner layer 614 is preferably comprised of materials as previously described.

Figure 6C:
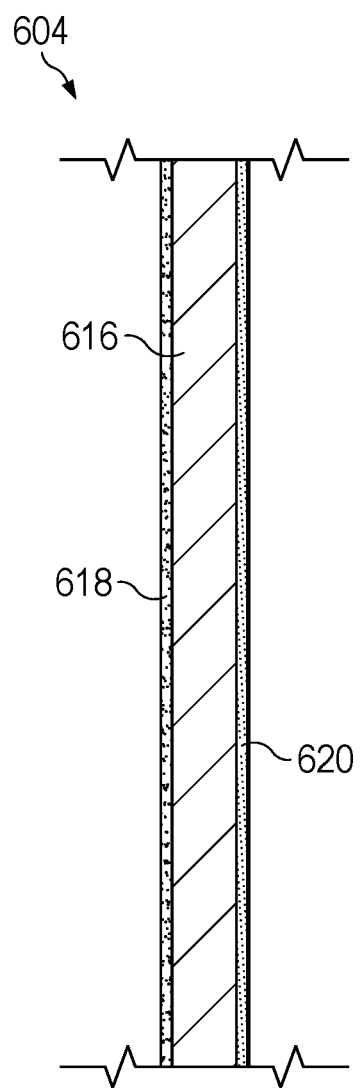
FIG. 6C is a cutaway view of a preferred panel.

Referring to FIG. 6C, an alternate and preferred panel construction will be further described.

Panel construction 604 includes single layer 616. Single layer 616 is preferably a flexible disposable bubble wrap material on which is deposited a metallic reflective service 618. Single layer 616 is preferably an antistatic silvered Mylar® or nylon film. In another preferred embodiment, single layer 616 is a polyester plastic such as polyethylene terephthalate (PET) available from DuPont Teijin Films US of Chester, Virginia Single layer 616 further comprises weatherproof coating 620. Preferably weatherproof coating 620 is a dark color or black polyurethane. In other embodiments, single layer 616 can be a disposable reflective insulation product such as Prodex Total Plus, available from Insulation4less.com, Inc. of Houston, Texas. In this embodiment, single layer 616 has a nominal thickness of between about 0.2 inches and about 0.4 inch and is a closed cell polyethylene foam including a reinforced foil facing. In another embodiment, single layer 616 is constructed of a vertically oriented corrugated cardboard having a normal thickness of between about 0.25 inches and about 0.5 inches.

Several distinct and novel advantages of the structure of the various panels of the reconfigurable cover are worth emphasizing.

The multiple, horizontal and diametrically opposed closure straps provide an important advantage because they allow differing perimeter tension to be applied to the cover at several locations along the height of the hive body. This is important because many times the covers, supers, and bottom board are not well aligned, thereby creating an irregular exterior surface of the hive body. The multiple closure straps allow the perimeter of the cover to be varied to compensate for the irregularities in the exterior surface of the hive body, thereby creating a tighter fit which reduces convective airflow between the inside of the cover and the outside of the hive body. Likewise, the circumferential straps provide the advantage of sealing the perimeter of the hive body to the inside of the cover in at least two locations, thereby further preventing convective heat escape by reducing vertical airflow along the exterior of the hive body.

One of skill will note that the positioning of the vertical straps adjacent the left and right sides of the hive body provides the advantage of securing the cover vertically on the hive body without distorting the opening adjacent the entrance reducer. Ideally, the opening fits flush against the bottom board and the lower super, thereby further preventing convective airflow and eliminate gapping. The adjustability of the vertical straps is also important because it allows the height of the skirt panel to be adjusted to cover the bottom board, yet not touch the ground. This is important to avoid moisture wicking from wet soil and reduce crawling pest infestations.

One of skill will also note the advantage that the upper panel fits flush against the lower surface of the outer cover but does not enclose the outer cover. This is important for humidity control as it allows airflow between the entrance, the inner cover, and the outer cover, as will be further described.

Another distinct and novel advantage of the structure of the various panels and attachment mechanisms is that each of the panels may be removed separately from the other panels. As an example, the lower panel may be removed without removing the upper panel or the skirt panel. Likewise, the panels may be detached one from another, yet not removed from the hive. In this way, the boxes and supers may be unstacked and serviced without detaching the cover from the hive. This is important in apiary maintenance when part of the hive needs to be cleaned or serviced while the other parts do not. Further, where multiple hives need to be serviced rapidly, such as an apiary or when the hive is in the field, most times beekeeper are gloved and masked. The gloves and masks reduce the visual acuity and dexterity of the beekeeper. Removing a single panel at a time reduces the need for great visual acuity and dexterity which would otherwise be required to remove the entire cover by disconnection of all buckles and straps. Hence, maintenance time of each hive is reduced appreciably.

Another distinct advantage to panel construction 602 is the reversible nature of a cover having such a construction. In use, during the winter months, the single layer insulating panel may be positioned on the hive cover with its radiant barrier facing inward, toward the exterior of the hive body. The exterior of the cover, being of a dark color, absorbs solar radiation, thereby warming the hive. Likewise, the radiant barrier on the inside surface reflects heat from the hive body, thereby reducing heat loss. In the summer months, a cover having panel construction 602 may be removed from the hive, reversed and replaced such that the dark surface faces inward toward the hive body, and the exterior radiant barrier faces outward away from the hive body. In this way, solar radiation is reflected away from the hive, thereby reducing heat gain and keeping the hive cooler. Likewise, the interior black coating draws heat from the hive body, moving it toward the radiant barrier, thereby also cooling the hive.

Another distinct advantage of panel construction 602 is that it is disposable. Because it is inexpensive, it may be easily replaced seasonally, thereby reducing overhead time for installation and maintenance and cost of the apiary.

Figure 7A:
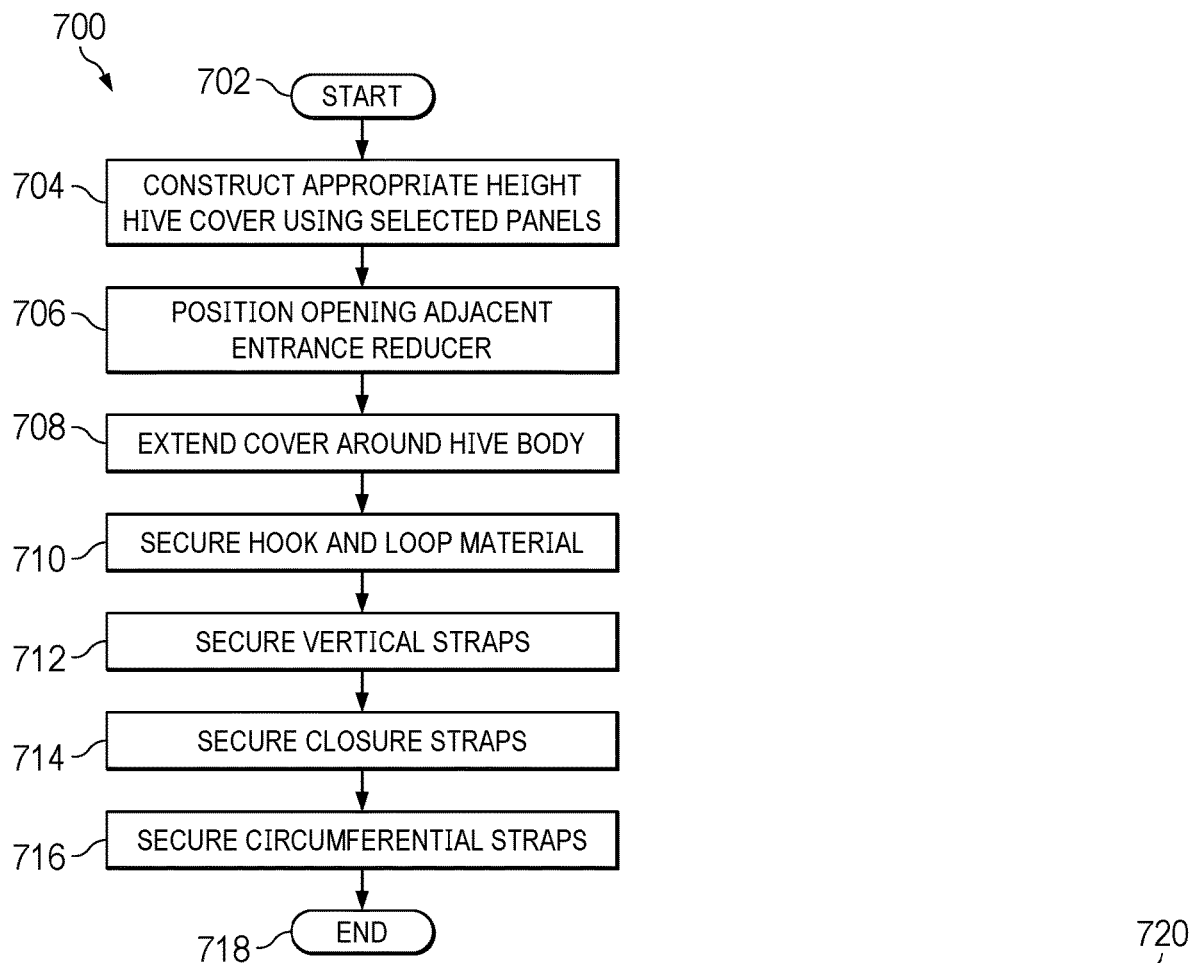
FIG. 7A is a flow chart of a preferred use of the hive cover.
Figure 8:
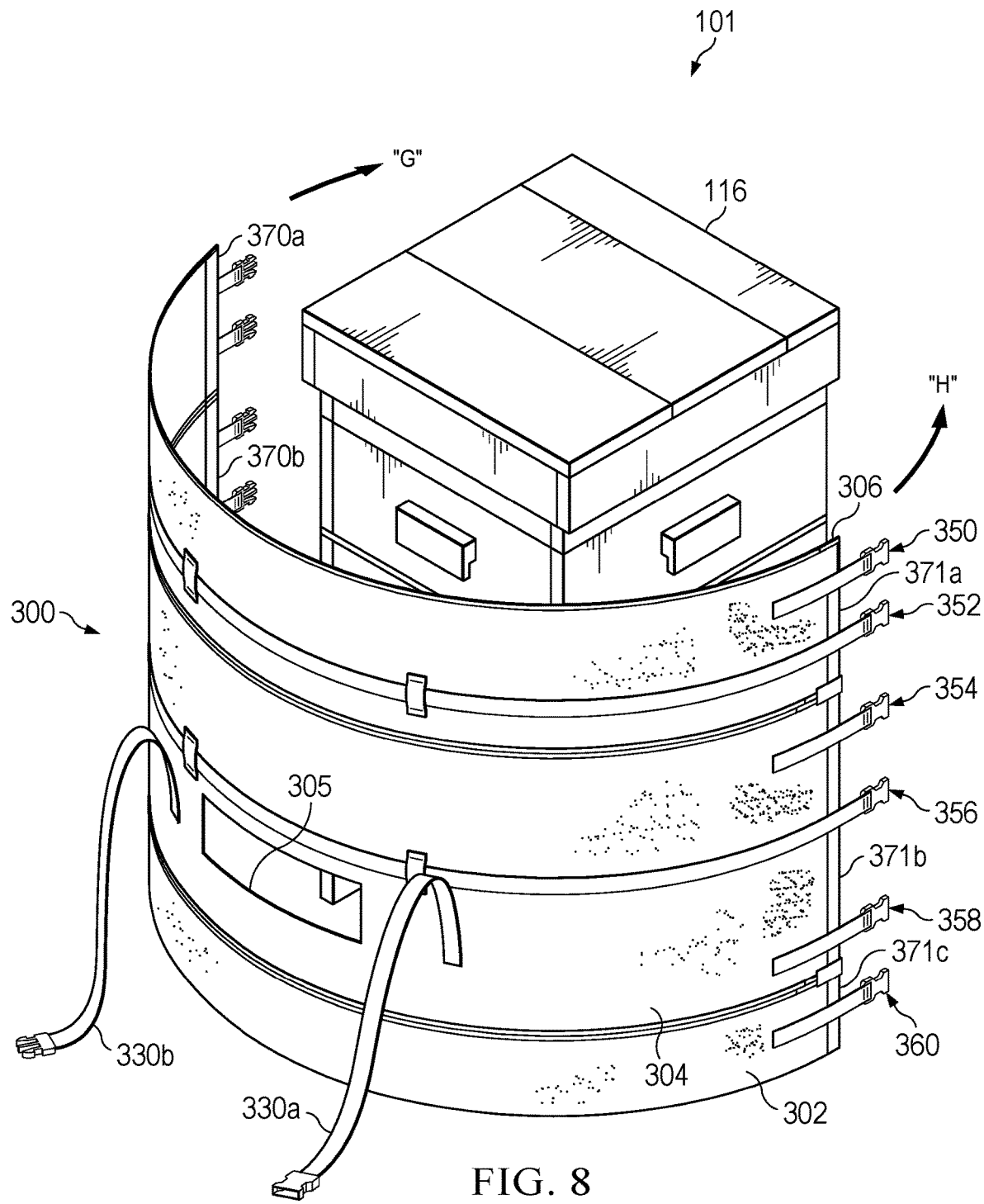
FIG. 8 is an isometric view of a preferred embodiment of the hive cover in use.
Figure 9:
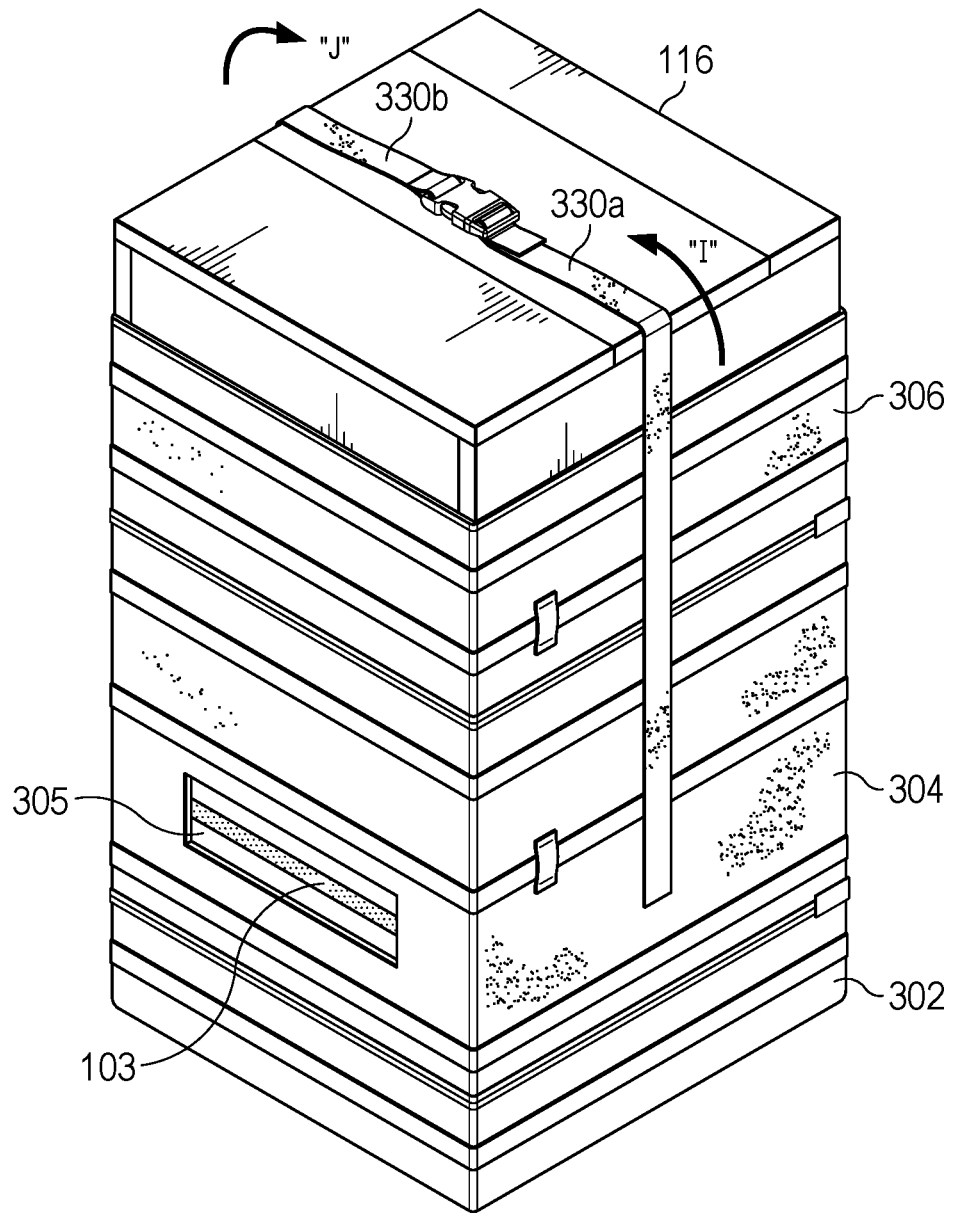
FIG. 9 is an isometric view of a preferred embodiment of the hive cover in use.

Referring to FIGS. 7A, 8 and 9, method 700 of attaching a preferred hive cover to a hive body will be further described.

At step 702, the method begins.

At step 704, the hive cover is assembled to a preferred height using at least a single skirt panel, a single lower panel, and an appropriate number of upper panels to assure that the entire hive body is covered. For various different hive bodies, no upper panel may be required, or one or more upper panels may be required. The panels are connected, one to the other, by removable attachment, as previously described.

At step 706, opening 305 is positioned adjacent entrance reducer 103 so that bees may pass from the exterior of the cover to the interior of the hive body.

At step 708, the hive cover is extended around the hive body in directions "G" and "H".

At step 710, hook tape 370a, 370b and 370c is secured to loop tape 371a, 371b and 371c, respectively.

At step 712, vertical straps 330a and 330b are secured in directions "I" and "J" across outer cover 116. The tension of the vertical straps is adjusted using the chape of the side release buckle so that skirt panel 302 is just above the surface on which the bottom board is placed.

At step 714, closure straps 351a, 351b, 355a, 355b, 359a, 359b, 361a and 361b are secured by their respective side release buckles. The tension of each of the closure straps is adjusted using the respective chapes of the respective side release buckles.

At step 716, circumferential straps 326 and 328 are secured around the perimeter of the hive body using their respective the side release buckles. The tension of the circumferential straps is adjusted to assure a tight fit of the cover against the exterior of the hive body using the respective chapes of the respective side release buckles.

At step 718, the method concludes.

Figure 7B:
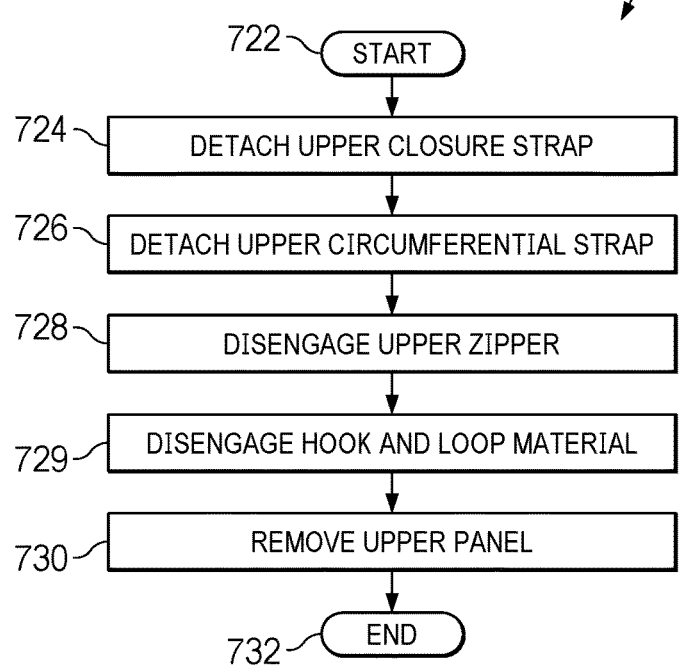
FIG. 7B is a flow chart of a preferred use of the hive cover.

Referring to FIG. 7B, method 720 of singularly detaching the upper panel will be further described.

At step 722, the method begins.

At step 724, closure strap 351a is detached from closure strap 351b by disengaging side release buckle 350.

At step 726, circumferential strap 328 is detached by disengaging buckle 352.

At step 728, zipper 310 is disengaged by moving car 318 from position "D" to "C", as previously described.

At step 729, hook tape 370a is disengaged from loop tape 371a.

At step 730, upper panel 306 is removed by sliding it underneath vertical strap 330a and vertical strap 330b.

At step 732, the method concludes.

Reattaching upper panel 306 to the cover may be accomplished by simply reversing the above noted steps.

Figure 7C:
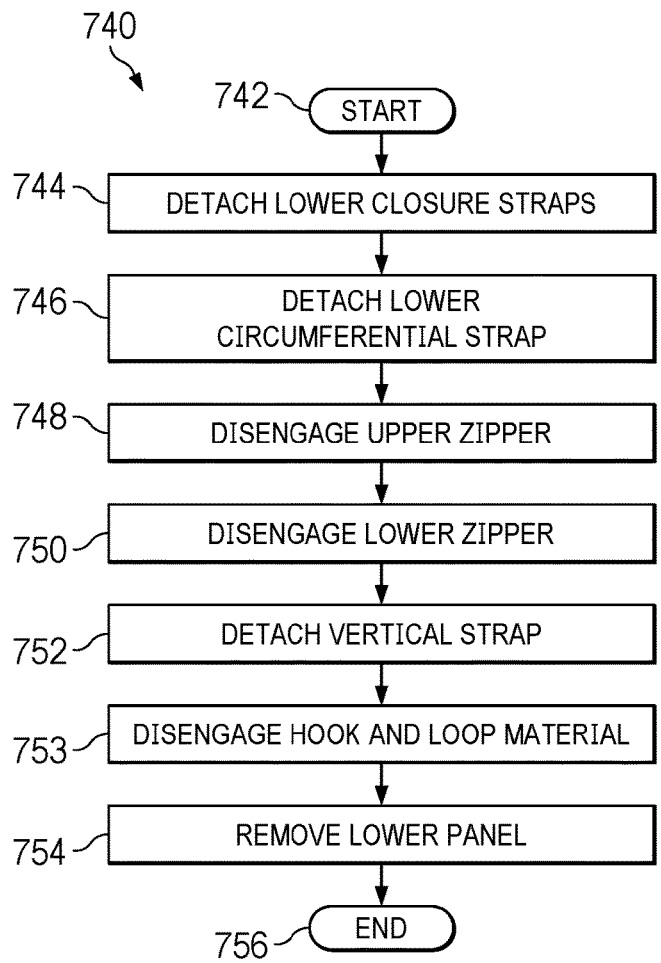
FIG. 7C is a flow chart of a preferred use of the hive cover.

Referring then to FIG. 7C, method 740 of singularly removing the lower panel will be further described.

At step 742, the method begins.

At step 744, closure strap 355a* is detached from closure strap 355b by disengaging side release buckle 354. Likewise, closure strap 359a is detached from closure strap 359b by disengaging side release buckle 358.

At step 746, circumferential strap 326 is detached by disengaging side release buckle 356.

At step 748, zipper 310 is disengaged by moving car 318 from position of "D" to "C", as previously described.

At step 750, zipper 308 is disengaged by moving car 314 from position "D" to position "A", as previously described.

At step 752, vertical strap 330a is detached from vertical strap 330b by disengaging side release buckle 362.

At step 753, hook tape 370b is disengaged from loop tape 371b.

At step 754, lower panel 304 is removed from the hive body.

At step 756, the method concludes.

It will be recognized that reattaching the lower panel may be accomplished by simply reversing the above noted steps.

Figure 7D:
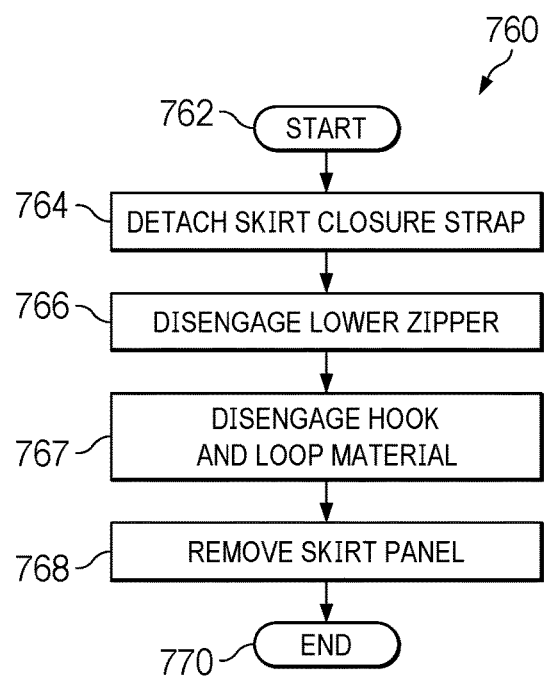
FIG. 7D is a flow chart of a preferred use of the hive cover.

Referring to FIG. 7D, method 760 of singularly removing the skirt panel will be further described.

At step 762, the method begins.

At step 764, closure strap 361a is detached from closure strap 361b by disengaging side release buckle 360.

At step 766, zipper 308 is disengaged by moving car 314 from position "B" to "A", as previously described.

At step 767, hook tape 370c is disengaged from loop tape 371c.

At step 768, the skirt panel is removed.

At step 770, the method concludes.

Of course, reattaching the skirt panel may be accomplished by simply reversing the above noted steps.

Referring to FIGS. 10A, 10B, 10C and 10D, experimental data of cover 300 in use will be further described.

A set of four tests was conducted to investigate the effectiveness of the cover.

Frames were added to a hive structure with no bees present. Temperature data was collected using two wireless sensors. One sensor was positioned inside the hive body. One sensor was positioned a distance of approximately 10 feet from the hive body to assure an accurate and consistent ambient temperature reading. Each sensor was a high precision wireless thermometer and hygrometer model No. HTP.XW available from Sensor Push of Brooklyn, New York.

The hive was located outside without a cover or other protection from the elements during winter. Once the ambient temperature reached its lowest point, ensuring no solar heating, testing commenced.

The hive was heated to 80° F. using a convective space heater. A tea light candle was then lit and placed inside the hive body to simulate the heat generated in a populated hive. The tea light is thermally representative of a honeybee brood over-wintering.

The ambient temperature during the tests varied from 29.62° F. to 30.38° F. for Tests 1 and 2 and between 30.33° F. and 30.48° F. for Tests 3 and 4. For each test, temperature, humidity, and pressure both inside and outside the hive were monitored and recorded at one-minute intervals.

Table 1 below is representative of the experimental temperature data obtained.

TABLE 1

| Test Number | Test Type | Temperature Drop (° F.) | Difference (° F.) | Heat Loss Reduction (%) |
|---|---|---|---|---|
| 1 | No Cover (1 hr.) | 12.8 | | |
| 2 | With Cover (1 hr.) | 1.8 | 11.0 | 86% |
| 3 | No Cover (2 hr.) | 16.0 | | |
| 4 | With Cover (2 hr.) | 6.8 | 9.2 | 57% |

Figure 10A:
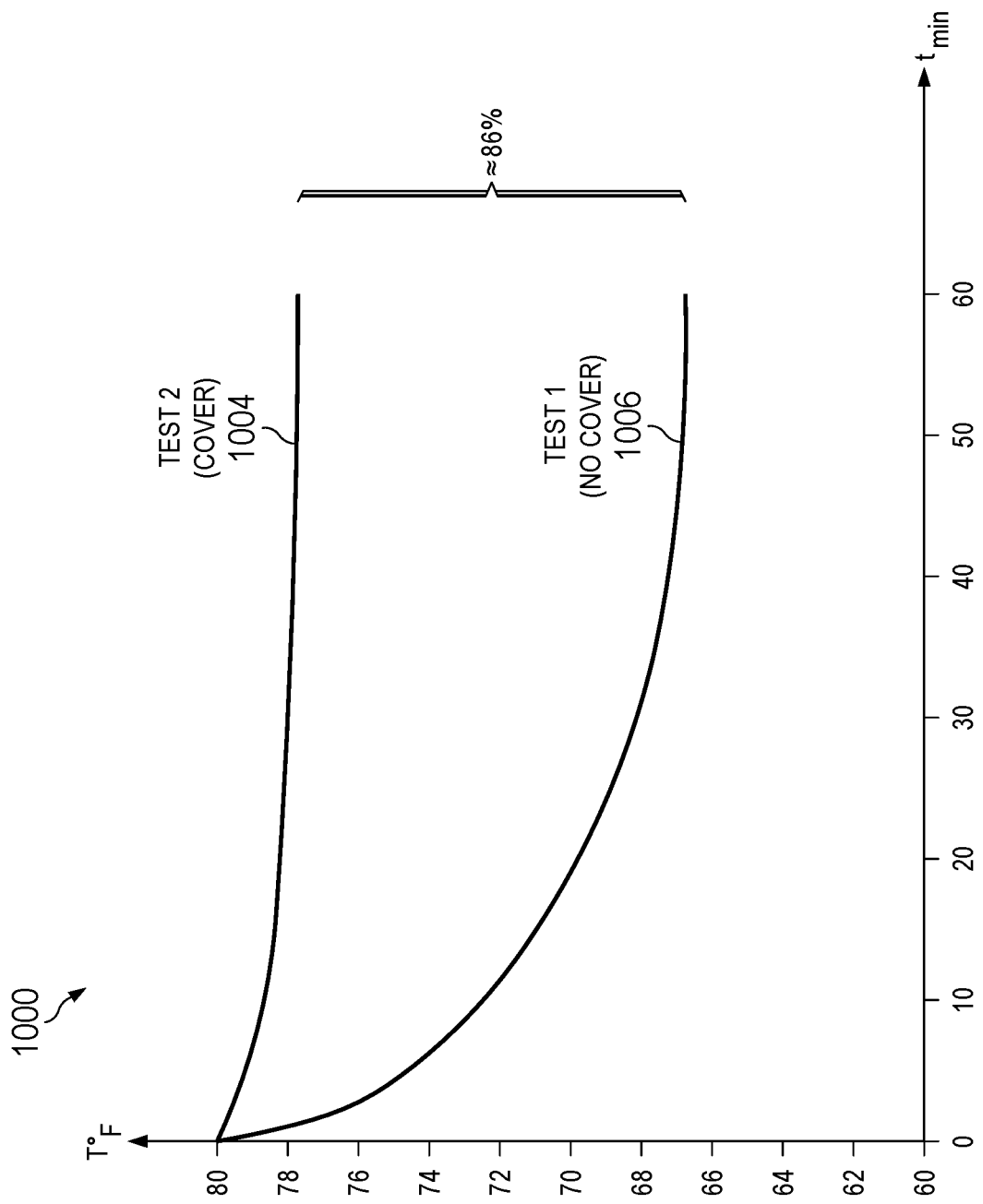
FIG. 10A is a graph of temperature test data.

Referring then to FIG. 10A, graph 1000 will be further described. Graph 1000 is representative of temperature data collected for Tests 1 and 2. Graph 1000 includes curves 1004 and 1006, set against time, in minutes, on the X axis, and temperature ° F., on the Y axis.

Curve 1006, for Test 1, indicates a declining exponential temperature drop showing about a 12.8° temperature drop from about 80° F. to about 67.2° F. over time span of 60 minutes. Likewise, curve 1004, for Test 2, indicates a 1.8° temperature drop from about 80° F. to about 78.2° F. over a span of 60 minutes. A comparison of curve 1004 and curve 1006 indicates a difference of approximately 86% at the 60-minute mark.

Figure 10B:
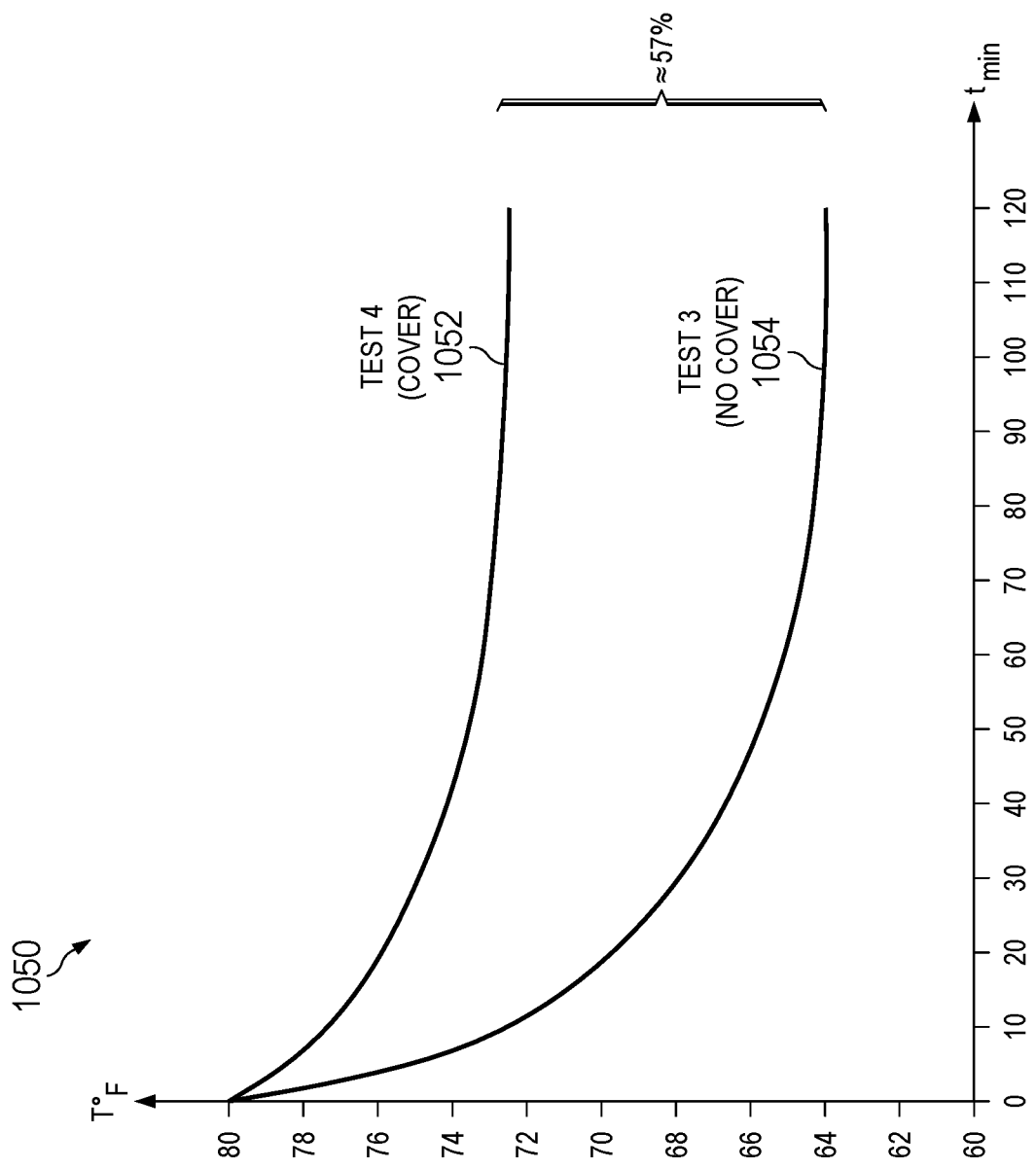
FIG. 10B is a graph of temperature test data.

Referring then to FIG. 10B, graph 1050 will be further described. Graph 1050 is representative of temperature data collected for Tests 3 and 4. Graph 1050 includes curves 1052 and 1054, set against time, in minutes, on the X axis, and temperature in ° F., on the Y axis.

Curve 1054, for Test 3, indicates a declining exponential temperature drop showing about a 16° temperature drop from about 80° F. to about 64° F. over time span of 120 minutes. Likewise, curve 1052, for Test 4, indicates about a 9.2° temperature drop from about 80° F. to about 70.8° F. over a span of 120 minutes. A comparison of the final temperatures shown in curve 1004 and curve 1006 indicates a difference of approximately 57% at the 120-minute mark.

Importantly, as shown by graphs 1000, 1050 and Table 1, the beehive suffered an 86% greater heat loss during the one-hour study without cover 300 as opposed to with cover 300. Likewise, the beehive suffered a 57% greater heat loss during the two-hour study without cover 300, as opposed to with cover 300.

Therefore, in use, cover 300 has shown surprising effectiveness in reducing heat loss during sub-freezing ambient conditions.

Referring then to FIG. 10C, graph 1100 will be further described.

Graph 1100 is representative of humidity data collected for Tests 1 and 2. Graph 1100 includes curves 1102 and 1104, set against time, in minutes, on the x-axis, and humidity in percentages, on the y-axis.

Curve 1102, for Test 1, indicates a generally increasing trend of rising humidity showing about a 12% increase in humidity from about 18% to about 30% over a span of 60 minutes. Likewise, curve 1104, for Test 2, indicates a reduced humidity from about 0 minutes to about 10 minutes, and then a generally increasing humidity from about 10 minutes to about 60 minutes, for a total humidity increase from about 21% to about 25% over a span of 60 minutes. A comparison of the final humidities shown in curve 1102 and curve 1104 indicates a difference of approximately 4% at the 60 minute mark.

Referring then to FIG. 10D, graph 1150 will be further described. Graph 1150 is representative of humidity data collected for Tests 3 and 4. Graph 1150 includes curve 1152 and curve 1154, set against time, in minutes, on the x-axis, and percent humidity, on the y-axis.

Curve 1154, for Test 3, indicates a generally rising trend showing an increase in humidity from about 27% to about 40% over a span of 120 minutes. Likewise, curve 1152, for Test 4, indicates a rapid humidity drop from 0 minutes to about 15 minutes and then a generally rising trend resulting in a total humidity drop from about 32% to about 31% over a span of 120 minutes. A comparison of the final humidity shown in curve 1152 and curve 1154 indicates a difference of approximately 10% at the 120 minute mark.

As shown by graphs 1100 and 1150, the beehive encountered a rise in humidity in each of the studies. However, the cover appears to stabilize relative humidity in the hive at a greater rate than without the cover by approximately 7% absolute percentage points of relative humidity. In each test, the cover provided significantly less variance in relative humidity from start to finish than its counterpart without the cover. Therefore, it can be seen that using the cover has a stabilizing effect on internal high relative humidity by as much as 45% to 65%.

The invention claimed is:

1. A reconfigurable cover for a hive comprising:
   a skirt panel;
   a first closure strap, fixed to the skirt panel;
   a second closure strap, fixed to the skirt panel, diametrically opposed to the first closure strap adapted to releasably connect to the first closure strap;
   a lower panel, having a hive entrance opening, releasably attached to the skirt panel;
   a third closure strap, fixed to the lower panel;
   a fourth closure strap, fixed to the lower panel, diametrically opposed to the third closure strap adapted to releasably connect to the third closure strap;
   a first circumferential strap, slidably retained on the lower panel and adapted to adjustably secure a perimeter of the hive; and
   wherein the skirt panel is releasably secured to the hive by connecting the first closure strap to the second closure strap;
   wherein the lower panel is releasably secured to the hive by the first circumferential strap and by connecting the third closure strap to the fourth closure strap.

2. The reconfigurable cover for the hive of claim 1, further comprising:
   a fifth closure strap, fixed to the lower panel; and a sixth closure strap, fixed to the lower panel, diametrically opposed to the fifth closure strap adapted to releasably connect to the third closure strap;
wherein the lower panel is releasably secured to the hive by connecting the fifth closure strap to the sixth closure strap.

3. The reconfigurable cover for the hive of claim 2, further comprising:
an upper panel, releasably attached to the lower panel;
a seventh closure strap, fixed to the upper panel; and
an eighth closure strap, fixed to the upper panel, diametrically opposed to the seventh closure strap adapted to releasably connected to the third closure strap;
wherein the upper panel is releasably secured to the hive by connecting the seventh closure strap to the eighth closure strap.

4. The reconfigurable cover for the hive of claim 3, further comprising:
a second circumferential strap, slidably retained on the upper panel and adapted to adjustably secure the perimeter of the hive;
wherein the upper panel is releasably secured to the hive by the second circumferential strap.

5. The reconfigurable cover for the hive of claim 4, further comprising:
a vertical strap, fixed to the lower panel, adjacent the hive entrance opening, adapted to span a hive cover of the hive.

6. The reconfigurable cover for the hive of claim 5, further comprising:
a first hook and loop closure, attached to the skirt panel;
a second hook and loop closure, attached to the lower panel; and
a third hook and loop closure, attached to the upper panel.

7. The reconfigurable cover for the hive of claim 5 wherein:
the skirt panel is attached to the lower panel by a first zipper;
wherein the lower panel is attached to the upper panel by a second zipper.

8. The reconfigurable cover for the hive of claim 1, wherein:
the lower panel further comprises one of a dark color layer and a light color layer;
an insulating central layer, adjacent the dark color layer; and
a radiant barrier, adjacent the insulating central layer.

9. The reconfigurable cover for the hive of claim 1, wherein the lower panel further comprises:
a dark color layer; and
a radiant barrier adjacent to the dark color layer.

10. The reconfigurable cover for the hive of claim 9, wherein:
the dark color layer comprises:
a bubble wrap material; and
the radiant barrier comprises a metallic coating.

11. A method of securing a hive cover to a hive comprising:
releasably connecting a skirt panel to a lower panel;
positioning a panel opening adjacent a hive entrance in the hive;
extending the hive cover about the hive;
securing a vertical strap, attached to the hive cover, over the hive cover; and
securing a closure strap, attached to the hive cover, about an exterior surface of the hive.

12. The method of claim 11, further comprising:
securing a first circumferential strap, slidingly attached to the hive cover, about a perimeter of the hive.

13. The method of claim 12, further comprising:
securing a second circumferential strap, slidingly attached to the hive cover, about the perimeter of the hive.

14. The method of claim 13, further comprising:
engaging a hook and loop closure, attached to the hive cover, to secure the hive cover, about the hive.

15. A method of apiary hive maintenance comprising:
providing a skirt panel removably fixed to a hive;
providing a lower panel, detachably connected to the skirt panel and removably fixed to the hive;
providing an upper panel, detachably connected to the lower panel and removably fixed to the hive; and
detaching and removing one of a group of the skirt panel, the lower panel and the upper panel, from the hive.

16. The method of claim 15, wherein the step of detaching and removing further comprises:
disengaging a zipper connected to one of the group of the skirt panel, the lower panel and the upper panel.

17. The method of claim 15, wherein the step of detaching and removing further comprises:
disengaging a hook and loop material on one of the group of the skirt panel, the lower panel and the upper panel.

18. A reconfigurable cover for a hive comprising:
a skirt panel;
a first vertical closure, fixed to the skirt panel;
a second vertical closure, fixed to the skirt panel, parallel to the first vertical closure adapted to releasably connect to the first vertical closure;
a lower panel, having a hive entrance opening, releasably attached to the skirt panel;
a third vertical closure, fixed to the lower panel;
a fourth vertical closure, fixed to the lower panel, parallel to the third vertical closure adapted to releasably connect to the third vertical closure; and
wherein the skirt panel is releasably secured to the hive by connecting the first vertical closure to the second vertical closure;
wherein the lower panel is releasably secured to the hive by connecting the third vertical closure to the fourth vertical closure.

19. The reconfigurable cover for the hive of claim 18, further comprising:
a strap closure, fixed to the lower panel, adjacent the hive entrance opening, adapted to span a hive cover of the hive.

20. The reconfigurable cover for the hive of claim 18, wherein:
the lower panel further comprises one of a dark color layer and a light color layer;
an insulating central layer, adjacent the dark color layer; and
a radiant barrier, adjacent the insulating central layer.

21. The reconfigurable cover for the hive of claim 18, wherein the lower panel further comprises:
a dark color layer; and
a radiant barrier adjacent to the dark color layer.

22. The reconfigurable cover for the hive of claim 18, wherein the first vertical closure, the second vertical closure, the third vertical closure and the fourth vertical closure are each formed of a hook and loop material.

* * * * *